United States Patent
Foltin

(10) Patent No.: US 10,486,631 B2
(45) Date of Patent: Nov. 26, 2019

(54) METHOD AND TRIGGER CIRCUIT FOR TRIGGERING AN AIRBAG SITUATED IN A STEERING WHEEL OF A MOTOR VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 15/822,903

(22) Filed: Nov. 27, 2017

(65) Prior Publication Data
US 2018/0154855 A1 Jun. 7, 2018

(30) Foreign Application Priority Data
Dec. 1, 2016 (DE) .......................... 10 2016 223 961

(51) Int. Cl.
*B60R 21/015* (2006.01)
*B60R 21/01* (2006.01)

(52) U.S. Cl.
CPC .. *B60R 21/01554* (2014.10); *B60R 21/01512* (2014.10); *B60R 21/01536* (2014.10); *B60R 21/01538* (2014.10); *B60R 21/01552* (2014.10); *B60R 2021/01231* (2013.01)

(58) Field of Classification Search
CPC ........ B60R 21/01554; B60R 21/01552; B60R 21/01512; B60R 21/01536; B60R 21/01538; B60R 2021/01231
See application file for complete search history.

(56) References Cited

U.S. PATENT DOCUMENTS

| 5,446,661 A * | 8/1995 | Gioutsos ............... B60R 21/013 180/273 |
| 2005/0189159 A1* | 9/2005 | Weber ................... B62D 1/046 180/315 |
| 2007/0040374 A1* | 2/2007 | Bullinger .......... B60R 21/01554 280/801.2 |
| 2008/0023946 A1* | 1/2008 | Haag .................... B60R 21/013 280/735 |
| 2017/0021799 A1* | 1/2017 | Hennes .................. B60R 22/48 |

FOREIGN PATENT DOCUMENTS

| DE | 19822850 A1 | 11/1998 |
| DE | 102007015768 B4 | 4/2010 |
| DE | 102013021930 A1 | 6/2015 |

* cited by examiner

*Primary Examiner* — Drew J Brown
(74) *Attorney, Agent, or Firm* — Norton Rose Fulbright US LLP; Gerard Messina

(57) ABSTRACT

A method for triggering an airbag situated in a position-adjustable steering wheel of a motor vehicle, including: a) ascertaining the relative spacing between a driver of the motor vehicle and the steering wheel, b) establishing a triggering event which necessitates the triggering of the airbag in the motor vehicle, c) establishing a trigger time and/or a firing strategy for the airbag, the relative spacing ascertained in step a) being taken into account, d) triggering the airbag at the established trigger time and/or using the established firing strategy. A trigger circuit for triggering an airbag is also described which is situated in a position-adjustable steering wheel of a motor vehicle, at least one measuring unit for establishing the position of the steering wheel or the relative spacing of the steering wheel from a driver being provided, and the trigger circuit includes an input for processing signals from this measuring unit.

18 Claims, 2 Drawing Sheets

METHOD AND TRIGGER CIRCUIT FOR TRIGGERING AN AIRBAG SITUATED IN A STEERING WHEEL OF A MOTOR VEHICLE

CROSS REFERENCE

The present application claims the benefit under 35 U.S.C. § 119 of German Patent Application No. DE 102016223961.9 filed on Dec. 1, 2016, which is expressly incorporated herein by reference in its entirety.

FIELD

The present invention relates to a method and a trigger circuit for the further improvement of available, already very highly developed systems for triggering an airbag in the event of an accident, in particular a frontal impact or a similar accident occurrence.

BACKGROUND INFORMATION

Conventionally, there are numerous sensors in motor vehicles, with the aid of which accidents and their sequence may be detected or even predicted. The most important safety systems of motor vehicles include airbags, in particular also an airbag which provides particular protection for the driver of a motor vehicle and is situated in a steering wheel. Airbags are also usually referred to as "passive" safety systems. The exact point in time of the firing of an airbag is crucial in different accident situations. Both a very early firing as well as a late firing of airbags is unfavorable for the occupants, in particular the driver. By way of an ideal adaptation of the firing time of an airbag as a function of a specific accident situation, a considerable improvement in the protection of the occupants may be effectuated. Yet another important group of safety systems are so-called "active" safety systems which may actively intervene into the accident occurrence. These include, for example, so-called emergency braking assistants.

German Patent Application No. DE 10 2013 021 930 A1 describes, for example, methods for operating safety systems for motor vehicles, in which information regarding the position of at least one occupant of the motor vehicle is taken into account.

In addition, German Patent Application No. DE 10 2007 015 768 B4 describes extensive options for detecting different accident situations with the aid of various sensors and for firing an airbag, at a suitable point in time, in response thereto.

Finally, German Patent Application No. DE 198 22 850 A1 describes various options for determining the presence of an occupant and his/her position and for influencing an airbag control method with the aid of this information.

SUMMARY

An object of the present invention is to solve or at least mitigate the technical problems associated with the related art. In particular, a method is provided, with the aid of which a further improved occupant protection with the aid of an airbag in the event of an accident is made possible.

Advantageous refinements and improvements of the present invention are described herein.

The present invention includes a method for triggering an airbag.

In an example method according to the present invention, a spacing between the driver of a motor vehicle and a steering wheel is therefore explicitly taken into account in the establishment of a trigger time and/or a firing strategy for an airbag (step c) and in the carrying out of calculations for the possible triggering of further safety measures.

In addition, a so-called nominal sitting position of the driver may be taken into account in order to establish the trigger time.

With the aid of this method, it is made possible to take into account the fact that, in the vast majority of motor vehicles, the steering wheel is position-adjustable, i.e., is adjustable in terms of its height and/or distance from the dashboard. In future vehicles including driver assistance systems, the steering wheel will optionally even be retractable and/or foldable. Retractable or foldable steering wheels are possible, in particular, in technically highly advanced vehicles which include a fully autonomous or at least a semiautonomous driving function. Since the driver airbag is accommodated in the steering wheel, this also means that there may be considerably different distances between the driver and the airbag, depending on the adjustment of the steering wheel. Previous systems do not process the position of the steering wheel during the triggering of the airbag. In the least favorable case, there are only assumptions, therefore, regarding the likely position of the driver and a mean position of the steering wheel.

A considerably higher level of precision in the establishment of the trigger time is made possible by explicitly ascertaining the spacing between the steering wheel and the driver (step a) and by establishing a trigger time and/or a firing strategy for the airbag as a function of this spacing (step c) in the case of a triggering event (step b). The protection of the driver by way of the airbag is improved. Risks associated with the use of the airbag (for example, risks of injury induced by the airbag) are reduced.

If an airbag is fired too late, for example during a frontal impact, the driver has already shifted forward so far that the airbag slams into his/her face and forces the head rearward. Due to the strong acceleration and hyperextension, neck injuries and head injuries, in particular, may occur, or the neck and brain may become injured.

If the airbag is fired too soon, however, it collapses again before the driver lies against the airbag. The braking effect of the airbag is then reduced and the likelihood increases that the occupant will impact the dashboard or the steering wheel through the airbag. Head and neck injuries are the result. Therefore, a preferably early firing is not always meaningful, but rather a firing that is optimal with respect to time is, and the different positions of a steering wheel that are possible today require that the firing time be adjusted by several milliseconds, if necessary.

In one preferred embodiment of the method, in step a), a normal position of the driver is assumed and only the position of the steering wheel is ascertained. This particularly simple approach requires only a small outlay for sensor systems and calculations and, therefore, is highly reliable. In addition, at least in modern adjustment systems for steering wheels, in which the position is adjusted with the aid of small electric motors and is usually also stored in a separate memory for different drivers, the particular position of the steering wheel is available anyway, and therefore no additional outlay for sensor systems is required.

In manual adjustment systems in particular, at least the approximate position of the steering wheel may be taken into account by way of a relatively simple sensor system, for example with the aid of measured values of a small number of sensors for the height and the length of a steering column.

Taking the position of a steering wheel into account becomes all the more important because there will be an increasing number of vehicles in the future, which, due to driver assistance systems, will render intervention by the driver unnecessary or less frequent, the steering wheel then being retracted into an inoperative position or even being folded in, whereby the problems are exacerbated.

In yet another preferred embodiment of the method, the relative spacing of the driver and the steering wheel is directly determined or is derived from other measuring data related to the driver and the position of the steering wheel.

To this end, it is possible, in principle, to accommodate a distance sensor, for example an ultrasonic sensor or a LIDAR sensor, in the steering wheel itself, which may precisely measure the spacing from the driver. A single measured value then suffices for determining the spacing of the steering wheel and the driver, which simplifies further processing, of course.

There are already so many functions situated in modern steering wheels, however, that it is not necessarily worthwhile to install yet another sensor. Generally, it is therefore possible to indirectly determine the relative spacing of the driver and the steering wheel by making use of other, already available measuring data. There are sensor systems, for example, in particular based on a video camera, with the aid of which the eyes of a driver or other physical features are observed. The distance of the driver from the dashboard may also be established with the aid of such video systems. With little outlay, it is also possible to ascertain the distance from the steering wheel with the aid of the same systems, since the upper area of the steering wheel frequently lies in the visual field of such video systems. With the aid of simple sensors situated on or in the dashboard as well, the positions of the driver and the steering wheel may also be ascertained, on the basis of which the relative spacing may then be easily determined.

Typically, the position of the steering wheel is not adjusted very frequently, so that its position does not need to be constantly redetermined, in particular not at a time close to an accident occurrence.

Overall, it may be established that the amount of additional outlay required for ascertaining the relative spacing of the driver and the steering wheel is that much less, the more highly equipped the vehicle is with safety sensors. Values denoting the position of a safety belt or denoting the setting of a driver's seat, in particular from a memory for different drivers of a vehicle, may be utilized in this case.

In one preferred specific embodiment of the present invention, at least one of the following measures, which are also triggered by the triggering event before or after the deployment of the airbag, is taken into account in the ascertainment of the relative spacing of the driver and the steering wheel: tightening the safety belt, moving the driver's seat, deforming the driver's seat, and collapsing the steering wheel. In this specific embodiment, it is assumed that the position of the driver is affected during the accident occurrence also by way of safety systems other than the airbag, which is significant for the trigger time of the airbag. In this way, the collapsing of the steering wheel, in particular, is a safety measure which has a strong effect on the spacing of the driver and the steering wheel, however, if the safety measure takes place before the triggering of the airbag. For this case, empirical values from crash tests or even a mean assumed position of the steering wheel may be utilized during an accident occurrence for the calculation of the firing time of the airbag.

Typically, in one preferred exemplary embodiment of the method, the trigger time will lie within predefinable limits and will tend to be that much later, the greater the ascertained relative spacing between the driver and the steering wheel is. This means that the driver is provided with the best protection at least in the event of a frontal impact or a similar accident occurrence.

It is to be noted that, frequently, not only must a firing time of an airbag be established in the event of an accident, but also that a two-stage or multi-stage firing system is present, in which a chronological sequence must be adapted to different stages during the firing. There may be different firing stages for an airbag. There are also systems, however, in which multiple airbags, each of which includes at least one firing stage, must be fired in the case of a triggering event. The sequence of the firing of a plurality of stages is also referred to as a firing choreography. With the aid of the present method, a plurality of firing times and/or a firing choreography may also be established with consideration for the present position of the steering wheel and the accident occurrence detected with the aid of other sensors.

Provided the driver airbag includes at least two trigger stages which are triggerable separately from each other, the firing times may be calculated separately for the individual trigger stages and a separate trigger time may be established for each trigger stage. This firing choreography is generally established via experimentation for different design types. In first approximation, it is to be noted, however, that, given a very small relative spacing of the driver and the steering wheel, all trigger stages should be fired in very close chronological succession or even simultaneously, in order to achieve a preferably rapid inflation of the airbag. Embodiment variants in which at least one airbag includes two or more firing stages are particularly preferred. In the case of an even smaller distance, it is then possible that one or several firing stages are omitted, in order to not allow the airbag to become too hard, for example. For example, lightweight, small persons who are to be represented with the aid of a so-called 5% dummy may thus be ideally protected. Additionally or alternatively, the firing of firing stages takes place in such a way that the pressure of the airbag is adapted for the case in which persons are located in an extremely close position directly at the airbag. It is particularly preferred when this also takes place by way of the omission of firing stages. It may then be ensured that the affected person is hit by the airbag weakly enough to not incur a serious injury. Simultaneously, a basic level of protection is still ensured. Given a large distance, longer time intervals between the individual trigger times may be provided.

In order to suppress firing stages, a suppressor, which suppresses the activation of the firing stage, is activated, if necessary.

A trigger circuit for triggering an airbag which is situated in a position-adjustable steering wheel of a motor vehicle is also described here. It is preferred when such a motor vehicle includes at least one unit for establishing the position of the steering wheel or the relative spacing of the steering wheel from a driver and the trigger circuit includes an input for processing signals from this unit. In highly developed motor vehicles having central data processing, this trigger circuit may possibly be part of a larger safety system; at the least, however, the position of the steering wheel or the relative spacing of the driver and the steering wheel is additionally fed to this safety system.

It is preferred that the trigger circuit include a logic for establishing a trigger time and/or a firing strategy for the airbag as a function of the position of the steering wheel or the relative spacing of the driver and the steering wheel. In this way, an essential parameter, which has previously not been sufficiently taken into account, for increasing the safety of the driver in the event of an accident, in particular a frontal impact, may be achieved.

In addition, a motor vehicle which is designed for carrying out the method is also provided in accordance with the present invention. As described, it is entirely possible that sensors and data processing systems already available today in motor vehicles suffice for gathering all required data and for carrying out the method when a motor vehicle is appropriately equipped, i.e., is supplemented by a trigger circuit which takes the relative spacing of the driver and the steering wheel into account for the trigger time and/or the firing strategy of the driver airbag.

Exemplary embodiments and details of the method and of the trigger circuit according to the present invention are described in greater detail below with reference to the figures.

DETAILED DESCRIPTION OF EXAMPLE EMBODIMENTS

Figure 1:
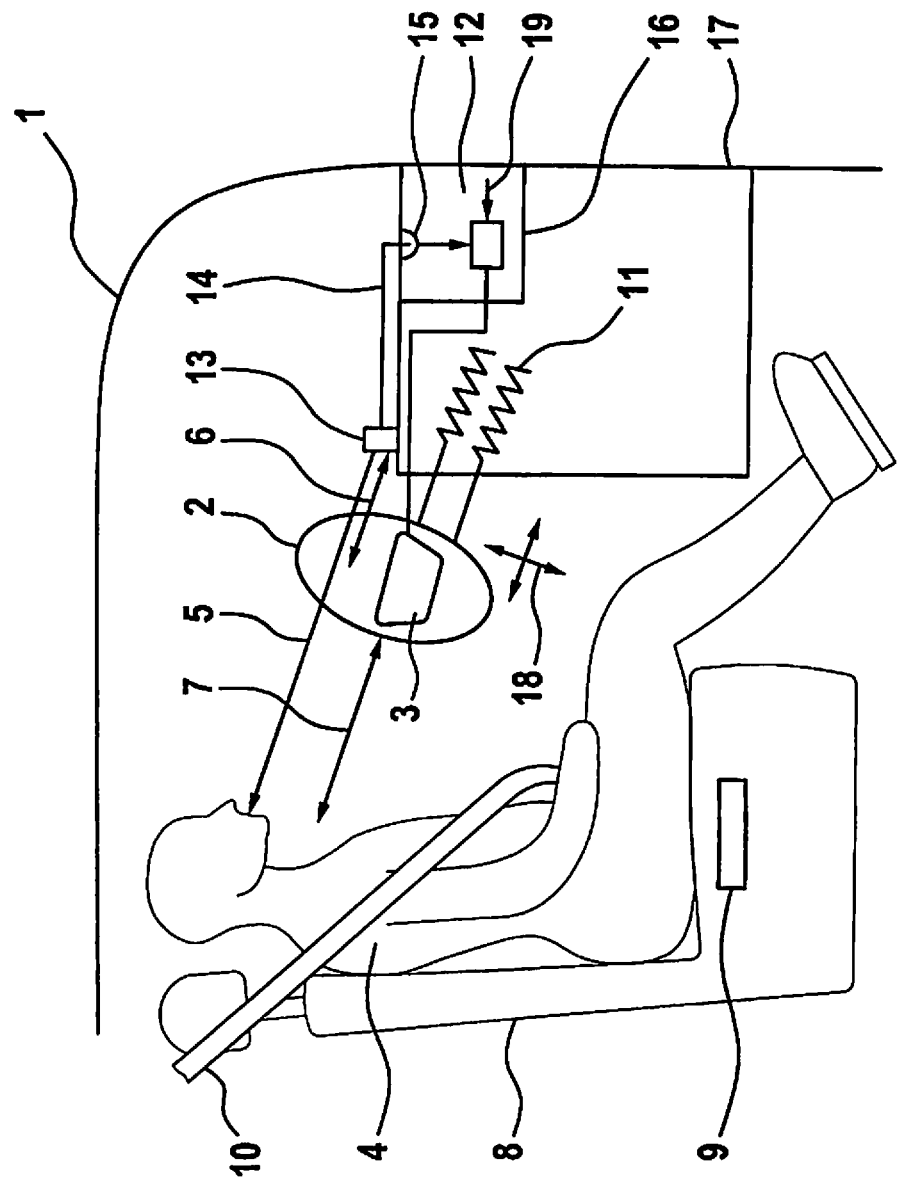
FIG. 1 schematically shows a combination of a vehicle and a driver before an accident.

FIG. 1 schematically shows the front part of an occupant compartment of a motor vehicle 1, and, in fact, the side of a driver 4 including a steering wheel 2. Steering wheel 2 is position-adjustable, i.e., its position is automatically or manually adjustable, as indicated by arrows 18, in particular being adaptable to a driver 4 with respect to spacing and height. It may also be a steering wheel 2 of an advanced vehicle 1 (optionally including an autonomous driving function), which is retracted or folded in, in certain driving situations. Integrated into steering wheel 2 is an airbag 3, the position of which may change with the position of steering wheel 2. A relative spacing 7 between driver 4 and steering wheel 2 results during driving, which depends on the physique of driver 4, on his/her sitting position, and on the adjustment of the position of steering wheel 2. During a frontal impact at a speed of 50 km/h, which is assumed in this case, by way of example, the head of driver 4 moves toward steering wheel 2 at approximately this speed, even a difference of approximately 14 cm in relative spacing 7 of steering wheel 2 from driver 4 resulting in a difference of approximately 10 ms (milliseconds) for the optimal firing time of the airbag. For this reason, it is provided in this case to take relative spacing 7 into account at the point in time of the triggering of airbag 3. In the present exemplary embodiment, relative spacing 7 is not directly measured, which would also be a meaningful application, however, in principle, but rather relative spacing 7 is determined by subtracting spacing 5 of driver 4 from a reference point, for example a measuring unit 13 situated in a dashboard 17, and spacing 6 of steering wheel 2 from the reference point. Measuring unit 13 may be, for example, a camera for monitoring the driver (driver monitoring camera—DMC), of the type already utilized in different safety systems. Simpler systems, for example including ultrasonic sensors, are alternatively usable. Measuring unit 13 may also measure spacing 6 from steering wheel 2, so that the relative spacing of driver 4 and steering wheel 2 may be determined fairly precisely, independently of the measured values. A separate measurement of the position of steering wheel 2 is not required in many cases in which steering wheel 2 is equipped with electrical servo drives or position sensors which detect the position of steering wheel 2 at all times anyway, or which have stored the position of the steering wheel. This is advantageous in the case of an accident, because the position of the steering wheel does not need to be measured first, which would shorten the time for responding, but rather is incorporated, as being known, into the further signal processing. Vehicle 1 is typically equipped with further safety devices for driver 4, for example a safety belt 10 (which may also include a seat belt tightener which is not represented) and a seat 8 including a seat adjuster 9, the seat being displaceable into a desirable safer position in the event of an accident. Finally, there are also vehicles in which steering wheel 2 is equipped with a collapsible unit 11, whereby the risk of injury to the driver is further reduced. All the safety sensors and safety devices of a vehicle 1 are connected to a trigger circuit 12 which makes decisions regarding the triggering measures and the points in time of the deployments according to predefinable criteria and rules. Trigger circuit 12 generates a trigger signal 19 for airbag 3, as necessary. This trigger circuit 12 is supplemented by a logic 16 which receives relative spacing 7 between driver 4 and steering wheel 2 by way of at least one signal line 14 via at least one input 15, and takes the relative spacing into account in the establishment of the trigger time for airbag 3. In certain situations, in which relative spacing 7 between driver 4 and steering wheel 2 is relatively great and the vehicle speed is relatively low, taking the relative spacing into account results in a delayed triggering of airbag 3, in order to find the point in time which is most favorable for the driver. Any safety measures initiated in parallel (seat belt tightener, seat adjuster 9, collapsible unit 11) may be taken into account, in this case, in terms of their effect on the position of driver 4.

Figure 2:
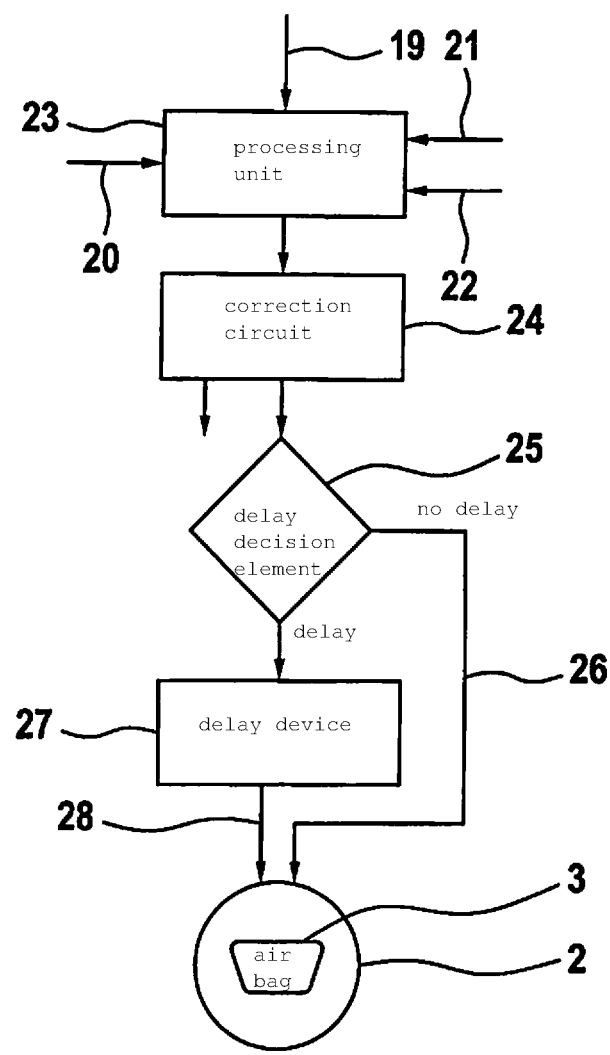
FIG. 2 shows, by way of example, the schematic sequence of the method during an accident.

FIG. 2 schematically shows the sequence of the method during triggering of an airbag 3 situated in a position-adjustable steering wheel 2. As soon as the safety systems of a motor vehicle 1 have detected the onset of an accident, a trigger signal 19 is usually generated in order to trigger driver's airbag 3. This trigger signal 19 is initially fed to a processing unit 23 for establishing relative spacing 7 of driver 4 and steering wheel 2. This processing unit 23 receives signals 21, 22 denoting the positions of driver 4 and of steering wheel 2 from suitable measuring units or from stored data. Optionally, further information 20 regarding safety measures, which are triggered in parallel and affect the position of driver 4 and/or steering wheel 2, may be supplied. Processing unit 23 ascertains the present relative spacing of driver 4 and steering wheel 2 for the accident occurrence. In a downstream correction circuit 24, further data available in the safety system of the vehicle are optionally taken into account, for example the speed upon impact, a classification of the expected accident occurrence, and the like. If airbag 3 is an airbag 3 which is fireable in two stages or multiple stages, this may also be taken into account in correction circuit 24. As a result, separate signals may be optionally generated for individual firing stages. In a downstream delay-decision element 25, it is then decided whether airbag 3 is to be triggered as rapidly as possible or in a delayed manner. In the case of a preferably rapid triggering, a direct signal 26 is forwarded to airbag 3. In the case of a desirable delay, a delay device 27 is activated, which delays the trigger signal by a delay time, which has been calculated from the available data, of 1 ms to 10 ms, for example, and then forwards the trigger signal, as a delayed signal 28, to airbag 3. In the case of a desirable suppression of a firing stage, a suppressor, which is not represented, is activated and suppresses the activation of the firing stage.

By way of the method described here and by way of the trigger circuit described here, the different relative spacing between the driver and a position-adjustable steering wheel in a motor vehicle may be taken into account in the establishment of the trigger time of a driver airbag in the event of an accident and, thus, may reduce the risk of injury to the driver.

What is claimed is:

1. A method for triggering an airbag which is situated in a position-adjustable steering wheel of a motor vehicle, comprising:
 a) ascertaining a relative spacing between a driver of the motor vehicle and the steering wheel;
 b) establishing a triggering event which necessitates the triggering of the airbag in the motor vehicle;
 c) establishing at least one of a trigger time for the airbag and a firing strategy for the airbag, the relative spacing ascertained in step a) being taken into account in the establishing of the at least one of the trigger time and the firing strategy; and
 d) triggering the airbag at least one of at the established trigger time and by way of the established firing strategy;
 wherein at least one of the following measures are taken into account in the ascertainment of the relative spacing between the driver and the steering wheel: (i) tightening a safety belt, triggered by the triggering event, (ii) displacing a seat, triggered by the triggering event, (iii) deforming a seat, triggered by the triggering event, and (iv) collapsing the steering wheel, triggered by the triggering event.

2. The method as recited in claim 1, wherein, in step a), a normal position of the driver is assumed and only the position of the steering wheel is ascertained.

3. The method as recited in claim 1, wherein, in step a), the relative spacing of driver and steering wheel is at one of directly determined or derived from other measuring data related to the driver and the position of the steering wheel.

4. The method as recited in claim 1, wherein the trigger time in step c) lies within predefinable limits and is that much later, the greater the ascertained relative spacing between driver and steering wheel is.

5. The method as recited in claim 1, wherein, in step c), at least two separately triggerable trigger stages are provided for triggering the airbag and a trigger time is established for each of the trigger stages.

6. The method as recited in claim 1, wherein the collapsing of the steering wheel, triggered by the triggering event, is taken into account in the ascertainment of the relative spacing between the driver and the steering wheel.

7. The method as recited in claim 1, wherein the deforming of the seat, triggered by the triggering event, is taken into account in the ascertainment of the relative spacing between the driver and the steering wheel.

8. The method as recited in claim 1, wherein the displacing of the seat, triggered by the triggering event, is taken into account in the ascertainment of the relative spacing between the driver and the steering wheel.

9. A method for triggering an airbag which is situated in a position-adjustable steering wheel of a motor vehicle, comprising:
 a) ascertaining a relative spacing between a driver of the motor vehicle and the steering wheel;
 b) establishing a triggering event which necessitates the triggering of the airbag in the motor vehicle;
 c) establishing at least one of a trigger time for the airbag and a firing strategy for the airbag, the relative spacing ascertained in step a) being taken into account in the establishing of the at least one of the trigger time and the firing strategy; and
 d) triggering the airbag at least one of at the established trigger time and by way of the established firing strategy;
 wherein, in step c), a suppressor is activated, which suppresses the triggering of at least one firing stage during the triggering of the airbag when the relative spacing lies below a predefinable threshold.

10. The method as recited in claim 9, wherein the airbag has at least two firing stages, and wherein in step c), the suppressor is activated, which suppresses the triggering of at least one of the at least two firing stages during the triggering of the airbag when the relative spacing lies below a predefinable threshold.

11. A trigger circuit for triggering an airbag which is situated in a position-adjustable steering wheel of a motor vehicle, the motor vehicle having at least one measuring unit configured to ascertain a relative spacing between the steering wheel and a driver, and the trigger circuit includes an input for processing signals from the measuring unit;
 wherein the trigger circuit includes a logic for establishing at least one of a trigger time for the airbag and a firing strategy for the airbag, the at least one of the trigger time and the firing strategy being established as a function of the relative spacing between the steering wheel and the driver; and
 wherein the trigger circuit triggers, in response to a triggering event, the airbag at least one of at the established trigger time and by way of the established firing strategy;
 wherein at least one of the following measures are taken into account in the ascertainment of the relative spacing between the steering wheel and the driver: (i) tightening a safety belt, triggered by the triggering event, (ii) displacing a seat, triggered by the triggering event, (iii) deforming a seat, triggered by the triggering event, and (iv) collapsing the steering wheel, triggered by the triggering event.

12. The trigger circuit as recited in claim 11, wherein the collapsing of the steering wheel, triggered by the triggering event, is taken into account in the ascertainment of the relative spacing between the steering wheel and the driver.

13. The trigger circuit as recited in claim 11, wherein the deforming of the seat, triggered by the triggering event, is taken into account in the ascertainment of the relative spacing between the steering wheel and the driver.

14. The trigger circuit as recited in claim 11, wherein the displacing of the seat, triggered by the triggering event, is taken into account in the ascertainment of the relative spacing between the steering wheel and the driver.

15. A motor vehicle designed to trigger an airbag which is situated in a position-adjustable steering wheel of the motor vehicle, the motor vehicle designed to:
 a) ascertain a relative spacing between a driver of the motor vehicle and the steering wheel;
 b) establish a triggering event which necessitates the triggering of the airbag in the motor vehicle;
 c) establish at least one of a trigger time for the airbag and a firing strategy for the airbag, the relative spacing ascertained in step a) being taken into account in the establishing of the at least one of the trigger time and the firing strategy; and d) trigger the airbag at least one of the established trigger time and by way of the established firing strategy;

wherein at least one of the following measures are taken into account in the ascertainment of the relative spacing between the driver and the steering wheel: (i) tightening a safety belt, triggered by the triggering event, (ii) displacing a seat, triggered by the triggering event, (iii) deforming a seat, triggered by the triggering event, and (iv) collapsing the steering wheel, triggered by the triggering event.

16. The motor vehicle as recited in claim 15, wherein the collapsing of the steering wheel, triggered by the triggering event, is taken into account in the ascertainment of the relative spacing between the driver and the steering wheel.

17. The motor vehicle as recited in claim 15, wherein the deforming of the seat, triggered by the triggering event, is taken into account in the ascertainment of the relative spacing between the driver and the steering wheel.

18. The motor vehicle as recited in claim 15, wherein the displacing of the seat, triggered by the triggering event, is taken into account in the ascertainment of the relative spacing between the driver and the steering wheel.

* * * * *